United States Patent [19]

Rutz

[11] 4,008,111
[45] Feb. 15, 1977

[54] AlN MASKING FOR SELECTIVE ETCHING OF SAPPHIRE

[75] Inventor: Richard Frederick Rutz, Cold Spring, N.Y.

[73] Assignee: International Business Machines Corporation, Armonk, N.Y.

[22] Filed: Dec. 31, 1975

[21] Appl. No.: 645,740

[52] U.S. Cl. .................... 156/656; 156/659; 156/661; 156/667

[51] Int. Cl.² .......... B29C 17/08; C23F 1/02; H01L 7/50

[58] Field of Search ........... 156/3, 8, 11, 13, 17, 156/15, 22; 29/580; 148/1.5; 252/79.1

[56] References Cited

UNITED STATES PATENTS

| | | |
|---|---|---|
| 3,743,552 | 7/1973 | Fa .................... 156/17 X |
| 3,753,775 | 8/1973 | Robinson et al. ........... 156/17 X |
| 3,855,112 | 12/1974 | Tomozawa et al. ......... 156/17 X |
| 3,899,363 | 8/1975 | Dennard et al. ............ 148/1.5 |

*Primary Examiner*—William A. Powell
*Attorney, Agent, or Firm*—Murray Nanes

[57] ABSTRACT

A method is disclosed for forming holes and depressions in aluminum oxide, including its sapphire form and spinels by etching using AlN as a maskant. This method is featured by the epitaxial deposition of an AlN film on a sapphire body, for instance. The AlN film is etched in a predetermined pattern and heat treated. The etchants used may be either $H_2$ or molten Al which will selectively attack the sapphire substrate in the regions exposed by the AlN mask.

26 Claims, 8 Drawing Figures

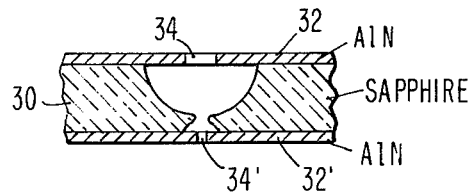
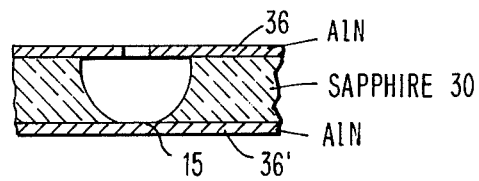
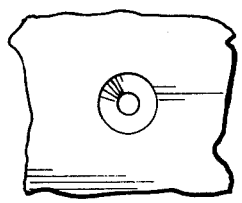
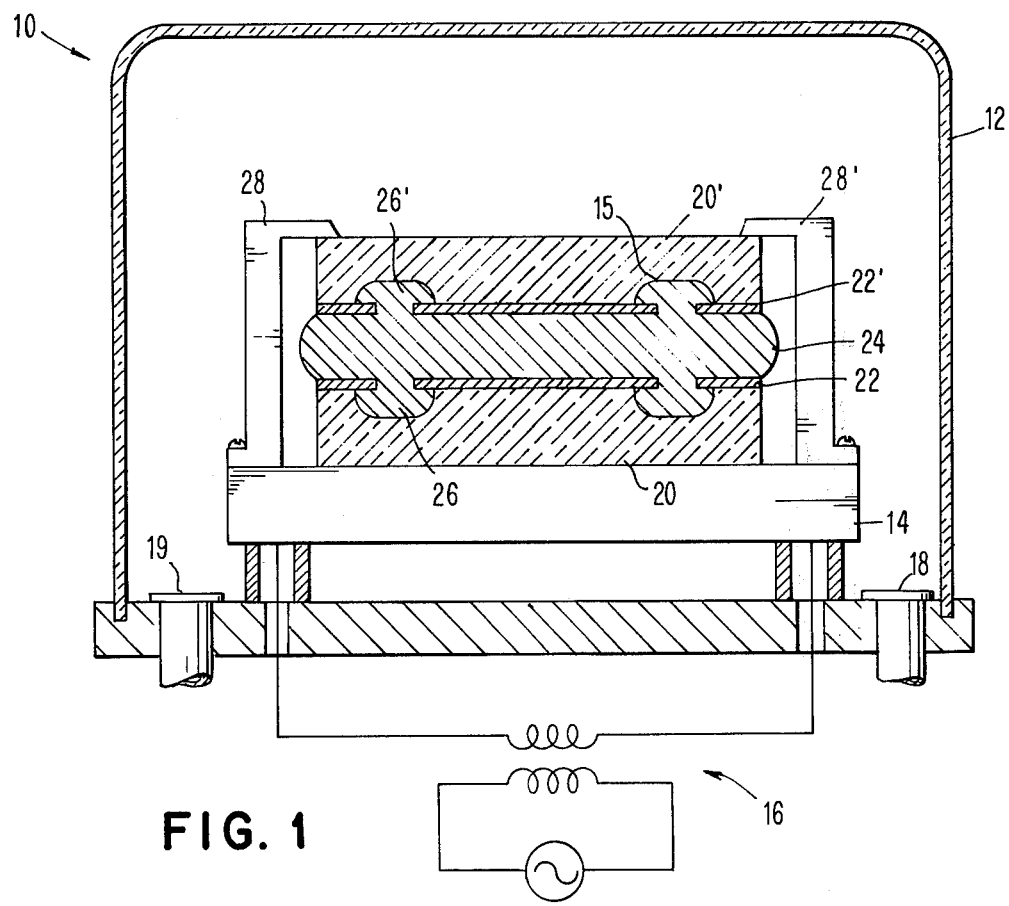

ALN MASKING FOR SELECTIVE ETCHING OF SAPPHIRE

BACKGROUND OF THE INVENTION

The present invention relates to a method of etching aluminum oxide $Al_2O_3$, especially its sapphire form and also spinels, utilizing an AlN etch resisting maskant.

Sapphire has a combination of properties which make it is desirable material both for use as a semiconductor substrate and for batch fabricated ink jet nozzles. In addition to being a hard material, it is resistant to cracking and chemically resistant to attack by most of the commonplace etchants used in semiconductor fabrication. It is also crystalline, transparent, insulating, and has a relatively high termal conductivity.

Interest in the use of sapphire for semiconductor fabrication has increased in recent years. For example, U.S. Pat. No. 3,743,552 to Charles H. Fa describes a method of isolating semiconductor islands wherein the semiconductor regions are electrically insulated by isolation sidewalls of sapphire substrate. The isolation sidewalls are fashioned in the sapphire substrate by preferentially treating the substrate with heat and phosphorous from a phosphorous doped oxide maskant. The method suffers in that phosphorous etching is not easily controlled and requires an additional etchant to remove the etching product. Also, because of the lack of control of the etching process, holes, for instance, of the dimensions required in ink-jet nozzles are not easily obtained.

Other etchants or polishing agents for sapphire are also known. For instance, U.S. Pat. No. 3,753,775 to Paul Harvey Robinson et al. discloses the use of borax as a polishing agent. A publication to P. F. Becker et al. entitled "Flame Polishing of Flat Oxide Bars," *The Science of Ceramic Machinery and Surface Finishing*, ed by S. J. Schneider, Jr., and R. W. Rice, National Bureau of Standards Special Publication 348, May 1972, p. 237, and the publication to J. T. A. Pollock, entitled "Continuous Flame Polishing of Sapphire Filament," *The Science of Ceramic Machinery and Surface Finishing*, ed by S. J. Schneider, Jr., and R. W. Rice, National Bureau of Standards Special Publication 348, May 1972, p. 247, describe a method of polishing sapphire with an oxyhydrogen torch.

Publications to R. W. Rice et al. entitled "The Strength of Gas Polished Sapphire Rutile," *The Science of Ceramic Machinery and Surface Finishing*, ed by S. J. Schneider, Jr., and R. W. Rice, National Bureau of Standards Special Publication 348, May 1972, p. 267, and to W. A. Schmidt et al. entitled "Preparation of Smooth Crystalline Damage Free, Sapphire Surfaces by Gaseous Etching," *The Science of Ceramic Machinery and Surface Finishing*, ed by S. J. Schneider, Jr., and R. W. Rice, National Bureau of Standards Special Publication 348, May 1972, p. 259, disclose the polishing of sapphire with helium-freon gases. These prior art polishing techniques are inadequate for providing sapphire insulating sidewalls or for providing inkjet nozzles, because of the lack of teaching of suitable selective etching by the polishing agents.

Batch fabricated arrays of nozzles for use in ink jet printing systems are known in the art. Such arrays have been etched in silicon. For example, U.S. Pat. No. 3,921,916 to Ernest Bassous, issued Nov. 25, 1975, and copending U.S. patent application Ser. no. 543,600, to E. Bassous et al., filed Jan. 23, 1975, teach the use of monocrystalline silicon for batch fabricated ink jets. The latter also refers to prior art ink jet nozzles which are formed by drilling holes in sapphire by mechanical means, or by the use of an electron beam or laser.

Work has been done on aluminum nitride and aluminum at temperatures to 2000° C as, for example, in an article in the Journal of the American Ceramic Society, 42[2], pp. 53–59, entitled "Aluminum Nitride, A Refractory For Aluminum to 2000° C," by G. Long and L. M. Foster. The following are quotes from p. 59 of the article:

"Contrary to the published data, high purity and highly sintered AlN was found to be very stable and extremely chemically inert to acids and bases. Its oxidation resistance was good, and, particularly, its stability in a reducing atmosphere was excellent . .

The ability of AlN to serve as an inert container for aluminum melts at elevated temperatures should permit more fundamental studies of aluminum and its behavior near its boiling point . . . Aluminum at elevated temperatures is an extremely active metal, and any container for it may have other refractory applications."

Insofar as the effects of $H_2$ on sapphire, Extended Abstracts, Volume 75-1 of the Electrochemical Society Spring Meeting, Toronto, Canada, May 11–16, 1975, Abstract No. 252 by E. A. Gulbransen and K. F. Andrew, indicates a study made, the objectives of which were, inter alia, to evaluate the effect of the oxygen potential of $H_2/H_2O$ gas mixtures on the reduction and volatilization (vapor transport) reactions of $Al_2O_3$ at 2000° C. They found that rapid transport reactions were found in dry hydrogen atmospheres.

SUMMARY OF THE INVENTION

In accordance with the present invention, there is set forth a method for etching small grooves, apertures and holes in $Al_2O_3$, especially sapphire, wherein a thin layer of aluminum nitride (AlN) is epitaxially deposited on the surface of a sapphire substrate and which has a desired pattern or etched holes and/or grooves. $H_2$ or molten aluminum, for example, may be used as etchants to etch the sapphire through the open areas of the AlN mask.

Thus, it is an object of the present invention to provide a method for etching predetermined patterns in $Al_2O_3$ and spinel substrates.

It is another object of the present invention to provide a method of fabricating sapphire ink jet nozzle arrays using the method of the invention.

It is a further object of the present invention to provide a method for selectively etching an AlN film.

It is still another object of the present invention to provide a method for selectively etching sapphire by using an AlN etch resistant mask on said sapphire.

It is a further object of the invention to provide a method of selectively etching sapphire selectively covered by an AlN film by heating in a furnace at a temperature to cause said AlN film to become resistant to the etchant.

It is another object of the invention to provide a method for controlling the size of holes etched in a sapphire body.

It is a further object of the invention to provide a method for selectively etching sapphire by depositing an AlN mask thereon and then heating in the presence of molten aluminum.

It is another object of the invention to provide a method for selectively etching sapphire by depositing an AlN mask thereon and then heating in the presence of $H_2$.

The foregoing and other objects, features and advantages of the invention will be apparent from the following more particular description of preferred embodiments of the invention, as illustrated in the accompanying drawings.

BRIEF DESCRIPTION OF THE DRAWINGS

FIG. 1 is a schematic view of a form of apparatus for carrying out the etching method of the present invention, using molten aluminum.

FIG. 2 is a cross-sectional side view of a single ink jet nozzle formed by a two-step molten aluminum etching method.

FIG. 3 is a cross-sectional view of a single ink jet nozzle formed by a one-step molten aluminum etching method.

FIG. 4 is a top view of an ink jet nozzle formed by the molten aluminum method illustrated in FIG. 3.

DETAILED DESCRIPTION

Figure 5:
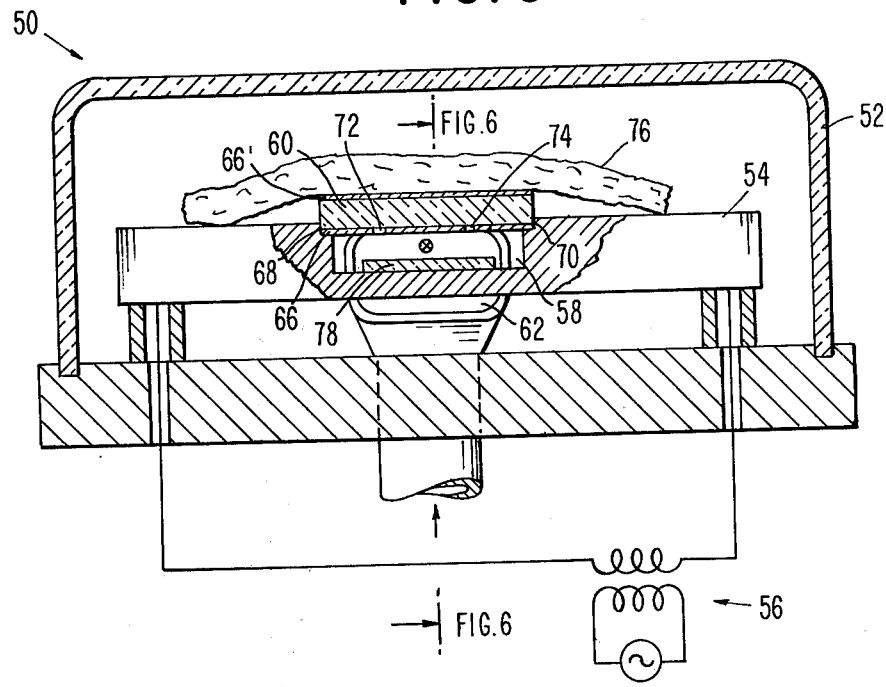
FIG. 5 is a schematic view of a form of apparatus for carrying out the etching of sapphire by using $H_2$.

It has been discovered that a sapphire body can be selectively etched using etchants and aluminum nitride as a maskant. More particularly, one method for etching sapphire bodies is described; including the steps of,
 a. depositing a thin AlN film on a sapphire body;
 b. etching a predetermined pattern in said AlN film;
 c. applying a metallic Al body on said patterned AlN film; and
 d. heating said sapphire body to cause Al to become molten, causing said AlN film to become resistant to said molten Al, whereby portions of said sapphire body not covered by said AlN film are etched according to said predetermined pattern.

Referring to FIG. 1, there is shown a form of an apparatus for carrying out one etching method of the present invention. The apparatus generally designated as furnace 10 comprises a heat resistant enclosure 12 having means 14 which is shown as being a tungsten heater strip having attached thereto a power source 16. The enclosure 12 has an opening 18 for the admission of an inert gas or forming gas into the inside of the chamber, and an opening 19 for the removal of gas from the chamber. Resting on heater strip 14 is sapphire body 20 having a thin film of AlN 22. Atop film 22 is a charge of molten aluminum 24 upon which is a second sapphire body 20' having a layer of AlN 22' thereon. Openings 26 and 26' are the areas etched by the molten Al 24 through etched portions of the AlN. The sapphire bodies 20 and 20' are maintained in place by clamps 28 and 28'. Clamps 28 and 28' prevent the molten Al from boiling.

In operation, a sapphire crystal preferably of (0001) orientation is masked by epitaxially depositing a thin film of AlN thereon. The deposition of AlN can be by conventional sputtering or evaporation techniques or by chemical vapor depostion. These depositions are done with the sapphire substrate held at a temperature above about 400° C and preferably above 900° C to insure a tight bonding of the AlN film to the sapphire. Best results are obtained when an epitaxial bond is formed between the sapphire and the AlN. A photoresist material such as Shipley Co., resist AZ-1350B is coated on the AlN film and exposed to radiation in a predetermined pattern and developed to open the patterned regions in the photoresist. The pattern in the AlN film is developed by etching the exposed areas of the AlN film with a hot mixture of 95% phosphoric acid and 5% nitric acid. For thin AlN films, e.g., 0.2 to 2.0 $\mu$m, the photoresist itself will resist this etch long enough to remove the desired AlN regions. The temperature of the etching mixture is about 150° C and where thick layers of AlN, e.g., 1$\mu$m to 4.0$\mu$m are used, the film may be masked with tungsten or other phosphoric acid resisting materials. The preferred thickness of AlN is about 1.2$\mu$m. The time of etching is typically a few minutes and the sapphire is essentially unaffected in this procedure because of the short time and low temperature involved. It should be noted that while tungsten can be used as a maskant for the photoresist it cannot be used as a maskant for sapphire because of the differences of expansion rates of the two materials. Further, tungsten will alloy with Al and otherwise have deleterious effects at the high temperatures used in the etching process.

After removal of the maskant from atop the AlN film, the sapphire body with its AlN mask is placed in the furnace as shown in FIG. 1 and as previously described. The sapphire body is then heated at a temperature of from about 1400° C to about 2000° C, and the ambient that is admitted into the furnace is preferably 85% Ar and 15% $H_2$. At these temperatures, AlN becomes increasingly crystalline and less porous and as a consequence more resistant to the then molten Al. The preferred temperature is about 1850° C. Heating is permitted to continue from 30 minutes to about 60 minutes at which time holes 4 mils deep are formed, when the hole-defining apertures in the AlN mask are 3 mils in diameter. The rate of etching is dependent upon the aperture size in the AlN mask. During the heating, the ambient gas is admitted through opening 18 into the enclosure. To prevent flowing of the molten Al out the sides, a small amount of $N_2$ may also be admitted to form a crust on the molten Al. The bottom of the etched holes on (0001) sapphire tend to be very flat and parallel to the (0001) plane of the sapphire body.

A surprising effect of the Al etching at temperatures above ~1750° C is that the etching approaches an isotropic action tending to make shiny sidewalls with a cross-section as shown in FIG. 1 and a very flat bottom 15 defined by the (0001) plane of the sapphire. Again, referring to the FIG. 1, the distance the molten Al region extends to is approximately the same in all directions from the surface so that the flat bottom 15 is in effect an "image" of the circular aperture opening in the AlN.

This isotropic action is desirable for ink jet nozzles or other liquid orifices since the smooth flow of the liquids is promoted. Most other etches for sapphire tend to be preferential to different crystalline directions forming faceting and terracing. The Al etching at high temperatures has been found to minimize faceting and terracing.

Other hole shapes and depths occur at different temperatures and times of etching and when the AlN mask is applied to crystal surfaces other than the (0001)

orientation. At lower temperatures and longer times the holes appear to be shaped by the principal planes (1010) (0001), and other planes, although intermediate planes can also be obtained. Under the temperatures and times given above and where openings in the AlN are smaller than about 15 $\mu$m, triangular or hexagonal cylindrical shapes may be obtained.

As illustrated in FIG. 1, two sapphire bodies are etched simultaneously by forming a sandwich.

For ink jet applications or other liquid nozzle apertures, the apertures can be fashioned by a two-stage process. For example, as in FIG. 2, sapphire body 30 is coated on both sides with AlN films 32–32' with matching holes 34 and 34' etched in the AlN films. The larger hole 34 (2 mils to about 4 mils) is first etched to a predetermined depth. The Al, remaining in the etched hole after etching has ceased, is removed by etching at room temperature in HCl which does not attack the AlN. The sapphire body 30 is then etched on the side with the small holes 34' (from 0.2 $\mu$m to about 1 $\mu$m) to form the aperture defining hole through the remaining sapphire. A web thickness of only a few microns of sapphire is found necessary to contain the normal pressures used in ink jets. The thickness of the sapphire web determines the diameter of the smallest exit hole possible in the sapphire itself. Thus, if the web thickness is two $\mu$m and the small hole in the AlN is 1.5 $\mu$m, the final hole diameter will be approximately 2 × 2 $\mu$m + 1.5 $\mu$m or 4.5 $\mu$m since the undercutting will be approximately equal to the depth of the etching. Interior to the sapphire, the smallest opening possible will be the mirror image of the small hole in the AlN or 1.5 $\mu$m in this case. To utilize an all sapphire orifice, the AlN layers can be etched away using the 95% phosphoric acid, 5% nitric acid etch. Alternately, the small AlN opening itself can be used as the final definition of the aperture in which case it may be as small as the photolithographic methods employed permit or submicron in diameter. AlN is itself a rugged refractory material resistant to most common etches other than hot phosphoric acid.

Alternately, as shown in FIG. 3, one side of the sapphire can be coated with AlN 36 with a hole pattern and the otherside with AlN 36' without holes. In this case etching procedes from the hole side until the flat bottom of the pit coincides with the AlN 36' on the far side. The AlN is then removed by etching in hot phosphoric acid and nitric solution and the final hole size will be the flat bottom of the pit. FIG. 4 shows a top view of such a hole.

Another version of the method for etching sapphire bodies will be described, including the steps of, a. depositing a thin AlN film on a sapphire body;
b. etching a predetermined pattern in said AlN film;
c. placing said sapphire body in a furnace into which H$_2$ is entered; and
d. heating said sapphire body, whereby portions of said sapphire body not covered by said AlN film are etched according to said predetermined pattern.

Figure 6:
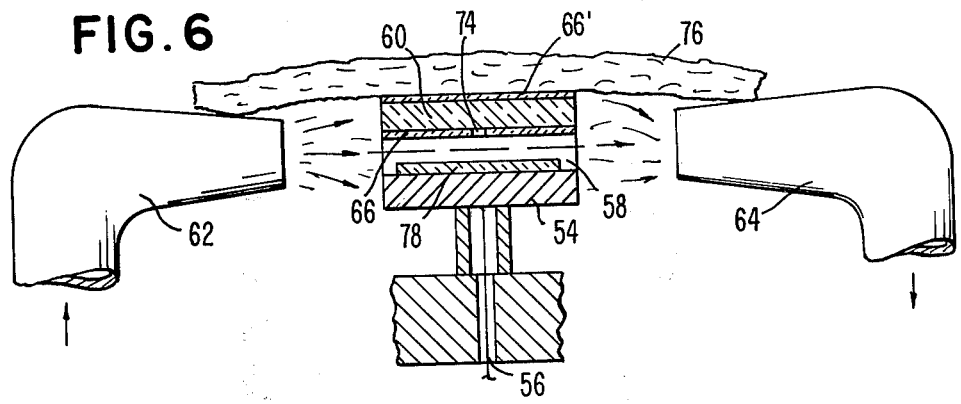
FIG. 6 is a schematic side view of FIG. 5 showing the flow of $H_2$ past the sapphire being etched.

Referring to FIGS. 5 and 6, there is shown a form of the apparatus for carrying out the H$_2$ etching method of the present invention. The apparatus generally designated as furnace 50 comprises a heat resistant enclosure 52 having a tungsten heater strip 54 therein attached to a power source 56. The heater strip 54 is slotted at 58 to provide a channel for the movement of the H$_2$ past the sapphire body 60 to be etched. The enclosure 52 has an opening 62 for the admission of the H$_2$ into the chamber and aligned to move it through the channel formed by the heater strip slot 58. An opening 64 is for the removal of the H$_2$ from the chamber. A practical flow rate for formation of small orifices suitable for ink jets through the furnace has been found to be about 1 liter/min. The sapphire body 60 has thin films 66 and 66' of AlN on its bottom and top surfaces, respectively, and is placed on niches 68 and 70 in the heater strip 54. For the purpose of illustration, two openings 72 and 74 in the AlN film 66 are the areas etched by the H$_2$. A carbon felt insulator 76 is placed as shown in FIG. 6 to help keep the movement of the H$_2$ past the sapphire 60 properly channelled.

Figure 7A:
FIG. 7A is a cross-sectional side view of a single ink jet nozzle formed by a one-step $H_2$ etching method.
Figure 7B:
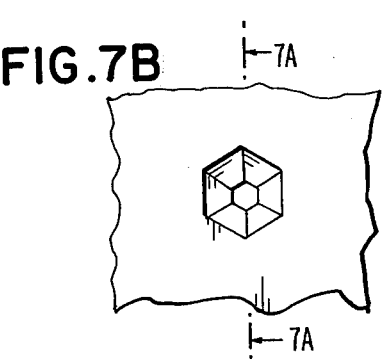
FIG. 7B is a top view of the ink jet nozzle of FIG. 7A.

For this method, the AlN films are epitaxially deposited on the sapphire just as in the molten aluminum etching and holes are made in the AlN films in the same way as previously described. The furnace is heated to 1400° to 2000° C., and holes of a type as shown in FIGS. 7A and 7B are formed in the sapphire. It can be seen that holes formed by the H$_2$ have a hexagonal rather than a circular cross-section in (0001) oriented sapphire wafers. The etching by H$_2$ is less isotropic than with molten aluminum and the etch patterns tend to show limits determined by certain planes, so that hexagonally shaped holes are formed. The pits will have a minute terracing effect, not sufficient to prevent the smooth flow of liquids, however.

AlN epitaxially deposited on sapphire as previously described has been found to be more than an order of magnitude more resistant to chemical attack by H$_2$, or a mixture of H$_2$ and an inert gas, than is Al$_2$O$_3$ at pyrolytic temperatures. Thus, AlN can also act as an etch resistant mask against H$_2$. H$_2$ is known to attack many other potential masking materials such as SiC or Si$_3$N$_4$ at the high temperatures required for reasonable rates of etching of the Al$_2$O$_3$. For short periods of time, say up to 30 minutes, a 1 $\mu$m thick layer of sputtered AlN on sapphire has been found to retain its integrity at ~1800° C and allows the etching of sapphire pits through 3 mil in diameter circular holes in the AlN to a depth of a few mils. If more prolonged etching is required as would be the case, for example, to make holes in sapphire plates 5 mils thick, it has been found advantageous to introduce a piece of AlN 78 formed by sintering or other means in the channel 58 in close proximity to the masked sapphire to be etched. The presence of the added AlN 78 stabilizes the AlN film on the sapphire and in addition promotes a very slight growth of AlN on the AlN film which acts to strengthen and protect it from disintegration.

Rather than have holes in the AlN masks on one surface of the sapphire only, it is possible to mask both sides of the sapphire plate with a 1 $\mu$m thick sputtered layer of AlN and etch two concentric holes in the layer, one being larger than the other. This can be done with standard photolithographic techniques as described previously. The transparency of the sapphire enables exact alignment of the holes in the AlN on either side of the sapphire. In practice, a 5 mil thick plate of sapphire might be used with a 3 mil diameter hole on one side and a 0.5 mil hole on the other. The side with the large masking hole would be etched first for a time such that only a thin web of sapphire a few $\mu$m thick remains between the bottom of the etched pit and the AlN on the other side of the sapphire. The other side of the sapphire plate with the smaller masking hole would then be etched until the small pit under it meets the larger cavity previously formed in a manner similar to that shown for Al etching in FIG. 2.

In this method, a sapphire is placed on the top side of the sapphire to be etched to prevent etching of the sapphire from the smaller holes while etching through the large holes. After etching of the large holes has proceeded until a thin web of sapphire remains, the temperature of the furnace is lowered and the sapphire is inverted so that the final small aperture hole-defining step of etching through the small holes can be done. The temperature is again raised and the final etching through the smaller hole is carried out in a similar fashion to that for the larger hole.

Again, the sputtered AlN layers may be left intact with the smaller holes in the AlN defining the aperture or alternately it may be removed by etching briefly in a hot phosphoric acid etch. The smallest diameter in the sapphire itself will then define the aperture.

A final trimming operation can be done to make the hole even smaller than its dimension originally determined by the photolithographic photoresist operation. It has been mentioned that a slight growth of AlN takes place due to the presence of the sintered stabilizing AlN piece 78. While this is only a slight effect at about 1800° C with the 85% Ar 15% $H_2$ ambient, the rate of growth of the AlN, can be greatly increased by changing the ambient gas to 85% $N_2$ 15% $H_2$, with other conditions being the same. The growth of the AlN tends to form a hexagonal shaped hole with smooth slanting side walls. The hexagonal opening will be rotated 30° to the hexagonal pit in the sapphire for (0001) wafer orientations. Thus, arbitrarily small holes can be formed with well-defined shapes. The etching of the sapphire in a 85% $N_2$ 15%$H_2$ is greatly inhibited so that the sapphire hole dimensions change negligibly during this trimming operation.

The above invention describes a novel and useful method for etching sapphire bodies in which AlN is used as an etch resistant mask to protect the sapphire from etchants such as molten aluminum and $H_2$. Although the invention has been specifically described in detail with respect to sapphire, it should be understood that other forms of $Al_2O_3$ and spinels ($MgAl_2O_4$) have also been etched by the method of this invention. It has been discovered that upon heating AlN to temperatures in the range of about 1700° C to about 2000° C it seems to become more densely crystalline and thereby becomes etch resistant.

Because AlN can withstand very high temperatures, a wide range of variation in the parameters, e.g., temperature, time, ambient gas flow and furnace geometry, etc., can be used for controlling etching rates. AlN is also found to be resistant to attack to almost all other common molten metals, such as silicon, calcium, iron, and the like, and can be used as an etch resistant mask for these as well.

What is claimed:

1. A method of etching $Al_2O_3$ including the steps of:
   a. depositing an AlN film with a predetermined pattern on said $Al_2O_3$; and
   b. heating said $Al_2O_3$ in the presence of an $Al_2O_3$ etchant whereby said $Al_2O_3$ is etched in said predetermined pattern.

2. A method for etching $Al_2O_3$ including the steps of:
   a. depositing an AlN film on said $Al_2O_3$;
   b. etching a predetermined pattern in said AlN film; and
   c. heating said $Al_2O_3$ in the presence of an $Al_2O_3$ etchant whereby said $Al_2O_3$ is etched in said predetermined pattern.

3. A method for etching $Al_2O_3$ including the steps of:
   a. depositing an AlN film on the $Al_2O_3$;
   b. forming a predetermined pattern in said AlN film;
   c. applying an $Al_2O_3$ etchant on said patterned AlN film; and
   d. heating said $Al_2O_3$ to cause said AlN film to become more resistant to said $Al_2O_3$ etchant whereby said $Al_2O_3$ is etched in said predetermined pattern.

4. A method for etching $Al_2O_3$ according to claim 3 wherein said $Al_2O_3$ is heated to a temperature of from about 1400° C to about 2000° C.

5. A method for etching $Al_2O_3$ according to claim 3 wherein said $Al_2O_3$ is heated to a temperature of about 1800° C.

6. A method for etching $Al_2O_3$ according to claim 2 wherein the $Al_2O_3$ etchant is metallic aluminum.

7. A method for etching $Al_2O_3$ according to claim 2 wherein said $Al_2O_3$ etchant is $H_2$.

8. A method for etching sapphire bodies including the steps of:
   a. depositing an AlN film on said sapphire body;
   b. etching a predetermined pattern in said AlN film; and
   c. heating said sapphire body in the presence of a sapphire etchant whereby said sapphire body is etched in said predetermined pattern.

9. A method of etching a sapphire body in a furnace according to claim 8 wherein the furnace contains an ambient comprising a mixture of an inert gas and $H_2$.

10. A method of etching a sapphire body according to claim 9 wherein said mixture comprises 85% Ar and 15% $H_2$.

11. A method for etching sapphire bodies according to claim 8 wherein said etchant is $H_2$.

12. A method for etching $Al_2O_3$ according to claim 1 wherein said sapphire etchant is metallic aluminum.

13. A method for etching $Al_2O_3$ according to claim 1 wherein the $Al_2O_3$ etchant is $H_2$.

14. A method for etching $Al_2O_3$ including the steps of:
   a. depositing an AlN film with a predetermined pattern on said $Al_2O_3$; and
   b. heating said $Al_2O_3$ in the presence of an $Al_2O_3$ etchant to cause said AlN film to become more resistant to the etch whereby said $Al_2O_3$ is etched in said predetermined pattern.

15. A method for etching $Al_2O_3$ according to claim 14 where the $Al_2O_3$ etchant is metallic aluminum.

16. A method for etching $Al_2O_3$ according to claim 14 where the $Al_2O_3$ etchant is $H_2$.

17. A method for etching sapphire bodies including the steps of:
   a. epitaxially depositing an AlN film on a sapphire body;
   b. forming a predetermined pattern in said AlN film;
   c. applying metallic aluminum on said pattern AlN film; and
   d. heating said sapphire body to cause said metallic aluminum to become molten and to cause said AlN film to become more resistant to said molten aluminum whereby said sapphire body is etched in said predetermined pattern.

18. A method for etching sapphire bodies including the steps of:

a. epitaxially depositing an AlN film on a sapphire body;
b. forming a predetermined pattern in said AlN film;
c. applying a metallic Al body on said pattern AlN film; and
d. heating said sapphire body to cause said Al to become molten and to cause said AlN film to become resistant to said molten Al, whereby said sapphire body is etched in said predetermined pattern.

19. A method for etching sapphire bodies according to claim 18 wherein said sapphire body is heated to a temperature of from about 1400° C to about 2000° C.

20. A method for etching sapphire bodies according to claim 18 wherein said sapphire body is heated to a temperature of about 1800° C.

21. A method for fabricating ink jet nozzle arrays including the steps of:
a. epitaxially depositing AlN films on the upper and lower surfaces of a sapphire body;
b. forming predetermined and matching aperture patterns in said AlN films said holes in said upper AlN film being larger than those in said lower AlN films;
c. etching said upper surface of said sapphire body in said predetermined pattern with molten Al for a time sufficient to etch to within about 2μm to about 20μm of the lower surface of said sapphire body;
discontinuing etching the upper surface and treating the etched regions with HCl to remove Al therefrom;
etching the lower surface of said sapphire body in said predetermined pattern with molten Al until such etched regions are in contact with the etched regions of said upper surface of said sapphire body;
removing Al from the etched regions with HCl and thereafter;
removing the AlN films from said surfaces of said sapphire body whereby there remains an array of ink jet nozzles.

22. A method for etching $Al_2O_3$ in a furnace including the steps of:
a. depositing an AlN film on said $Al_2O_3$;
b. etching a predetermined pattern in said AlN film;
c. heating said $Al_2O_3$ in the presence of metallic aluminum; and
d. inserting into the furance an ambient including $N_2$ to contain the aluminum on the $Al_2O_3$, whereby said $Al_2O_3$ is etched in said predetermined pattern.

23. A method for etching $Al_2O_3$ in a furnace including the steps of:
a. depositing an AlN film on said $Al_2O_3$;
b. etching a predetermined pattern of holes in said AlN film;
c. heating said $Al_2O_3$ and AlN film in the presence of $H_2$ and an additional AlN source;
d. inserting into the furnace an additional ambient of $N_2$, whereby said AlN film holes are decreased in size by an epitaxial deposition on the AlN film from the additional AlN source; and
e. subsequently removing $N_2$ from the ambient and heating said $Al_2O_3$ whereby said $Al_2O_3$ is etched according to the decreased size holes of the AlN film.

24. In a method for etching $Al_2O_3$ in a furnace including the steps of:
a. depositing an AlN film on said $Al_2O_3$;
b. etching a predetermined pattern of holes in said AlN film;
c. heating said $Al_2O_3$ and AlN film in the presence of $H_2$ and an additional AlN source whereby said $Al_2O_3$ is etched in said predetermined AlN film pattern of holes; and
d. inserting into the furnace an additional ambient of $N_2$, whereby said holes in the AlN film are decreased in size by epitaxial deposition on the AlN film from the additional AlN source.

25. A method of etching $MgAl_2O_4$ including the steps of:
a. depositing an AlN film with a predetermined pattern on said $MgAl_2O_4$; and
b. heating said $MgAl_2O_4$ in the presence of an $MgAl_2O_4$ etchant whereby said $MgAl_2O_4$ is etched in said predetermined pattern.

26. A method for etching $MgAl_2O_4$ including the steps of:
a. depositing an AlN film on the $MgAl_2O_4$;
b. forming a predetermined pattern in said AlN film;
c. applying an $MgAl_2O_4$ etchant on said patterned AlN film; and
d. heating said $MgAl_2O_4$ to cause said AlN film to become more resistant to said $MgAl_2O_4$ etchant whereby said $MgAl_2O_4$ is etched in said predetermined pattern.

* * * * *